Dec. 26, 1944.  G. WILSON  2,365,790
CROP DIVIDER
Filed Feb. 5, 1943
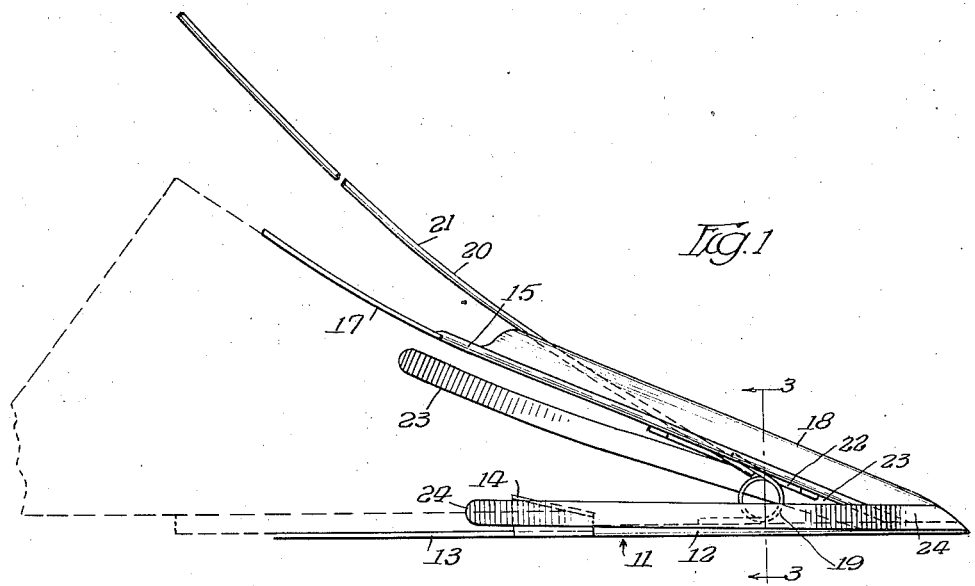
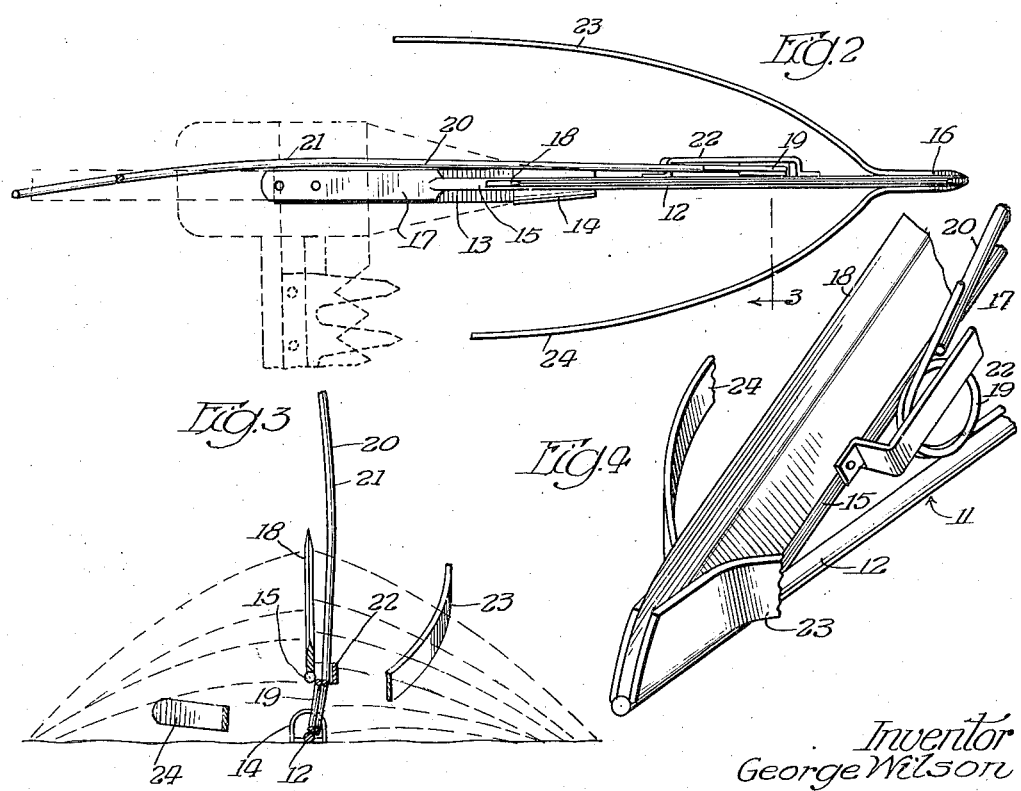
Inventor
George Wilson
By Spencer, Marzall, Johnston & Cook
Attys.

Patented Dec. 26, 1944

2,365,790

UNITED STATES PATENT OFFICE 2,365,790

CROP DIVIDER

George Wilson, Carlton, Oreg.

Application February 5, 1943, Serial No. 474,768

10 Claims. (Cl. 56—315)

This invention relates in general to a crop divider and more particularly to a device for cutting and disentangling grain and other crops, including vetch and other crops of heavy, rank growth which tend to become tangled and, therefore, are difficult to harvest, and especially as an attachment to a harvesting machine such as a combine for such purposes.

An object of this invention is to provide compact, simple and efficient means to be attached to a combine to cut and separate tangled grain and guide it to engagement with the cutting means of a harvesting machine, particularly of the combine type, and to aid in preventing the obstruction or clogging and stalling of such means in the harvesting of crops of heavy, rank growth.

Other objects of this invention include the provision of novel cutting means for cutting tangled grain in the harvesting thereof, including vibrating means and guide means adapted to be attached to a grain combine to disentangle tangled or snarled masses of grain by cutting, agitating, and forcing the separation thereof, and directing the cut and separated grain to the cutting means of such a machine.

Additional objects, advantages and capabilities inherent in this invention will become readily apparent from the drawing thereof which follows.

This invention further resides in the combination, construction and arrangement of parts illustrated in the accompanying drawing, and while there is shown therein a preferred embodiment of the invention it is to be understood that the same is susceptible of modification and change without departing from the spirit of the invention.

The accompanying drawing illustrates a selected embodiment of the invention, and the views therein are as follows:

Fig. 1 is a side elevation of the invention;

Fig. 2 is a plan view of the invention as attached to a combine, a portion of the cutting means of which is indicated in dotted lines;

Fig. 3 is a vertical sectional view along the line 3—3 of Fig. 1;

Fig. 4 is a fragmentary perspective view of a portion of the invention.

The particular device herein disclosed for the purpose of illustrating the invention comprises a supporting member or base 11 which, as shown, consists of two parts, namely, a steel rod 12 having an extension at one end in the form of a bar 13, preferably of spring steel. A shoe 14 is provided on the member 11 adjacent the forward end of the bar portion 13. This shoe is adapted to receive or fit upon the end of a short outside divider usually provided on harvester machines or combines. This shoe is shaped so that the end of the divider of the harvester or combine will fit securely therein.

One end of a metal rod 15 is secured to the rod 12 at its forward end 16. The rod 15, which is disposed in rearwardly extending angular relation with the member 11, is provided with an extension in the form of an angle bar 17. The bar 17, preferably of spring metal, is secured to the rear end of the rod 15. The bar 17, the rear portion of which is slightly curved upwardly, is provided with suitable bolt holes and adapted to be mounted upon the outside divider of the harvester or combine. An upstanding knife or cutting member 18 is provided on the rod 15, the forward end of the member 18 being positioned adjacent the forward end of the rods 12 and 15.

One end of a coil spring 19 is connected with the rod 12, approximately midway of the rod. The other end of the spring 19 is connected with a long rod 20 at one end thereof. This rod, which is preferably of resilient metal, is angularly disposed generally with relation to the member 11 and has an intermediate curved portion 21. The spring 19 is arranged and the rod 20 is so connected therewith that this rod will be spaced slightly from the rod 15 and the knife or cutting member 18. A guard 22 is provided on the side of the rod 15 adjacent the rod 20 and is so arranged as to prevent too great movement of the rod 20 in a lateral or vertical direction.

In order to facilitate the cutting and disentangling operation outer and inner guard members 23 and 24 are provided. The purpose of the inner guard member is to protect what is known as the off end of the sickle of the harvester or combine so that the straw will not clog the sickle at this point of least cutting power. The outer guard serves the purpose of assisting in working the grain against the cutting member and creating a cutting action with the knife. The outer and inner guard members 23 and 24 are connected with the rods 12 and 15 adjacent their forward ends. These guard members are preferably of spring metal. The outer guard member 23 is disposed at an angle with a horizontal intermediate that of the rod 16 and is slightly curved away therefrom. The inner guard member 24 is also angularly disposed with respect to the rod 12, but at an angle to the horizontal intermediate that of the guard 23 and is curved away therefrom, but oppositely from guard member 23. Guard member 24 is shown welded to the members 12 and 15 but may be detachable as its use is required only in the case of very heavy, rank and tangled crops.

The parts, as shown, are connected or secured together by welding, except as otherwise stated, but may be made integral or connected or secured together in other suitable manner.

In a device which has produced satisfactory results in operation the parts were constructed as follows:

The lower base or supporting member comprised an iron rod ¾" in diameter and a bar ¼" thick by 1¼" wide; the overall length of the member being approximately 36"; and the shoe being mounted approximately midway of the length thereof. The knife was approximately 26" long and 1¾" wide and was mounted on a rod ¾" in diameter and approximately 4' long. The inner and outer guard members were made of spring steel approximately ¼" thick and 1¼" wide; the inner guard member being approximately 2' long and the outer guard member approximately 30" long; the rear end of these members being spaced approximately 6" laterally from the member 11; and the rear end of the outer and inner guard members being spaced above the member 11 approximately 10" and 2" respectively. The rod 20 was a spring rod ⅝" in diameter and approximately 8½' long.

The rod 20 is arranged so that it will vibrate and thereby assist in operating the knife, increasing its cutting action, the vibration serving to increase the cutting action of the knife. The rod 20 also serves to train the grain on to the draper and into the cylinder of the combine. The rod 20 may be manipulated if desired.

The device operates to divide and lift the grain at the outer end of the cutting side of the combine, cutting the tangled mass of grain and guiding it on to the draper and into the cylinder.

Changes may be made in the form, construction and arrangement of the parts without departing from the spirit of the invention, and the right is hereby reserved to make all such changes as fairly fall within the scope of the following claims.

The invention is hereby claimed as follows:

1. A divider attachment for a harvesting machine comprising a supporting member adapted to be mounted upon a portion of the machine adjacent the outer extremity of the cutting means thereof, a second supporting member disposed in angular relation with the first supporting member and having one of its ends connected with said first member adjacent one end thereof, the other end portion of said second member being adapted to be mounted upon a portion of said machine in spaced relation with said first portion, a cutting member mounted on one of said members, resilient means connected with said first member and disposed in angular spaced relation with said second member and in cooperative relation with said cutting member, said resilient means being adapted to vibrate as the machine is operated and thereby enhance the cutting action of said cutting member, and guard means connected with one of the supporting members.

2. A divider attachment for a harvesting combine comprising a supporting member adapted to be mounted upon a portion of the combine adjacent the outer extremity of the cutting means thereof, said supporting member being provided with a shoe adapted to receive a portion of the outer divider of the combine in cooperative relation therewith, a second supporting member disposed in angular relation with the first supporting member and having one of its ends connected with said first member adjacent one end thereof, the other end portion of said second member being adapted to be mounted upon a portion of said combine in spaced relation with said first portion, a cutting member mounted on one of said members, a spring member connected with said first member and disposed in angular spaced relation with said second member and in cooperative relation with said cutting member, said spring member being adapted to vibrate as the machine is operated and thereby enhance the cutting action of said cutting member, and guard means connected with one of the supporting members.

3. A divider attachment for a harvesting machine comprising a supporting member adapted to be mounted upon a portion of the machine adjacent the outer extremity of the cutting means thereof, a second supporting member disposed in angular relation with the first supporting member and having one of its ends connected with said first member adjacent one end thereof, the other end portion of said second member being adapted to be mounted upon a portion of said machine in spaced relation with said first portion, one of said supporting members being resilient and adapted to vibrate as the machine is operated, a cutting member mounted on the resilient one of said members, resilient means connected with said first member and disposed in angular spaced relation with said second member and in cooperative relation with said cutting member whereby to enhance the cutting action of said cutting member, and guard means connected with one of the supporting members.

4. A divider attachment for a harvesting machine comprising a supporting member adapted to be mounted upon a portion of the machine adjacent the outer extremity of the cutting means thereof, a second supporting member disposed in angular relation with the first supporting member and having one of its ends connected with said first member adjacent one end thereof, a cutting member mounted on one of said members, resilient means connected with said first member and disposed in angular spaced relation with said second member and in cooperative relation with said cutting member, said resilient means being adapted to vibrate as the machine is operated and thereby enhance the cutting action of said cutting member, and guard means connected with one of the supporting members.

5. A divider attachment for a harvesting machine comprising a supporting member adapted to be mounted upon a portion of the machine adjacent the outer extremity of the cutting means thereof, a second supporting member disposed in angular relation with the first supporting member and having one of its ends connected with said first member adjacent one end thereof, the other end portion of said second member being adapted to be mounted upon a portion of said machine in spaced relation with said first portion, said second member being adapted to vibrate as the machine is operated, a cutting member mounted on said second member, resilient means connected with said first member and disposed in angular spaced relation with said second member and in cooperative relation with said cutting member whereby to enhance the cutting action of said cutting member, and guard means connected with one of the supporting members.

6. A divider attachment for a harvesting machine comprising a supporting member adapted to be mounted upon a portion of the machine adjacent the outer extremity of the cutting means thereof, a second supporting member disposed in angular relation with the first supporting member and having one of its ends connected with said first member adjacent one end thereof, the other end portion of said second member being adapted to be mounted upon a portion of said machine in spaced relation with said first portion, an upstanding cutting member mounted on one of said members and having one of its ends adjacent the connection between said members, vibrating means connected with said first member and disposed in angular spaced relation with said second member and in cooperative cutting relation with said cutting member, and guard means connected with one of the supporting members.

7. A divider attachment for a harvesting machine comprising a supporting member adapted to be mounted upon a portion of the machine adjacent the outer extremity of the cutting means thereof, a second supporting member disposed in angular relation with the first supporting member and having one of its ends connected with said first member adjacent one end thereof, the other end portion of said second member being adapted to be mounted upon a portion of said machine in spaced relation with said first portion, a cutting member mounted on one of said members, spring means connected with said first member in spaced relation with the connection between said supporting members, said spring means having an extension disposed in angular spaced relation with said cutting member and adapted to cooperate therewith, and guard means connected with one of the supporting members.

8. A divider attachment for a harvesting machine comprising a supporting member adapted to be mounted upon a portion of the machine adjacent the outer extremity of the cutting means thereof, a second supporting member disposed in angular relation with the first supporting member and having one of its ends connected with said first member adjacent one end thereof, the other end portion of said second member being adapted to be mounted upon a portion of said machine in spaced relation with said first portion, a cutting member mounted on one of said members, vibrating spring means connected with said first member and disposed in angular spaced relation with said second member and in cooperative relation with said cutting member whereby to enhance the cutting action of said cutting member, guard means mounted on one of said members and adapted to cooperate with said spring means, and guard means connected with one of the supporting members.

9. A divider attachment for a harvesting machine comprising a supporting member adapted to be mounted upon a portion of the machine adjacent the outer extremity of the cutting means thereof, a second supporting member disposed in angular relation with the first supporting member and having one of its ends connected with said first member adjacent one end thereof, the other end portion of said second member being adapted to be mounted upon a portion of said machine in spaced relation with said first portion, a cutting member mounted on one of said members, said cutting member being adapted to vibrate as the machine is operated, resilient means connected with said first member and disposed in angular spaced relation with said second member, said resilient means being adapted to vibrate in cooperative cutting relation with said cutting member, and guard means connected with one of the supporting members and comprising curved inner and outer members, each of said members having one end thereof in angular spaced relation with one of said supporting members.

10. A divider attachment for a harvesting machine comprising a supporting member adapted to be mounted upon a portion of the machine adjacent the outer extremity of the cutting means thereof, a second supporting member disposed in angular relation with the first supporting member and having one of its ends connected with said first member adjacent one end thereof, a cutting member mounted on one of said members, resilient means connected with one of said supporting members and adapted to vibrate during operation of the machine and thereby facilitate the operation of the cutting member, and guard means connected with one of the supporting members, the parts being so arranged and conformed as to cooperate to divide entangled grain and direct the same in untangled form to the cutting means of the machine and thereby prevent clogging thereof during operation of the machine.

GEORGE WILSON.